(12) United States Patent
Hines et al.

(10) Patent No.: US 12,190,617 B2
(45) Date of Patent: *Jan. 7, 2025

(54) METHOD AND SYSTEM FOR DETECTING DRIFT IN TEXT STREAMS

(71) Applicant: Capital One Services, LLC, McLean, VA (US)

(72) Inventors: Keegan Hines, Washington, DC (US); Christopher Bayan Bruss, Washington, DC (US)

(73) Assignee: Capital One Services, LLC, McLean, VA (US)

( * ) Notice: Subject to any disclaimer, the term of this patent is extended or adjusted under 35 U.S.C. 154(b) by 544 days.

This patent is subject to a terminal disclaimer.

(21) Appl. No.: 17/463,734

(22) Filed: Sep. 1, 2021

(65) Prior Publication Data

US 2022/0019836 A1    Jan. 20, 2022

Related U.S. Application Data

(63) Continuation of application No. 16/744,420, filed on Jan. 16, 2020, now Pat. No. 11,138,458, which is a
(Continued)

(51) Int. Cl.
*G06V 30/148* (2022.01)
*G06F 18/20* (2023.01)
(Continued)

(52) U.S. Cl.
CPC .......... *G06V 30/153* (2022.01); *G06F 18/214* (2023.01); *G06F 18/2321* (2023.01);
(Continued)

(58) Field of Classification Search
CPC .......... G06V 30/153; G06V 30/19107; G06V 30/10; G06F 18/214; G06F 18/2321; G06F 18/295
See application file for complete search history.

(56) References Cited

U.S. PATENT DOCUMENTS 8,909,643 B2    12/2014  Ankan et al.
10,579,894 B1    3/2020  Hines et al.
(Continued)

FOREIGN PATENT DOCUMENTS

CN    108446408 A    8/2018

OTHER PUBLICATIONS

Dec. 10, 2015—Deep residual learning for image recognition. Kaiming He et al. Microsoft Research.
(Continued)

*Primary Examiner* — Tom Y Lu
(74) *Attorney, Agent, or Firm* — Banner & Witcoff, Ltd.

(57) ABSTRACT

Methods and systems disclosed herein may quantify the content and nature of first streaming data to detect when the typical composition of the first streaming data changes. Quantifying the content and nature of the first streaming data may begin by generating a baseline representation of the content of the first streaming data as represented by a first matrix. Once generated, the first matrix may be used as a control against subsequently received data streams. In this regard, a second matrix may be generated from second streaming data and compared to the first matrix to determine the differences between the first streaming data and the second streaming data. Once a difference is determined, the difference may be compared to a threshold value and, when the difference exceeds the threshold value, an administrator may be notified and corrective action taken.

20 Claims, 7 Drawing Sheets

Related U.S. Application Data continuation of application No. 16/514,009, filed on Jul. 17, 2019, now Pat. No. 10,579,894.

(51) Int. Cl.
*G06F 18/214* (2023.01)
*G06F 18/2321* (2023.01)
*G06V 30/19* (2022.01)
*G06V 30/10* (2022.01)

(52) U.S. Cl.
CPC ...... *G06F 18/295* (2023.01); *G06V 30/19107* (2022.01); *G06V 30/10* (2022.01)

(56) References Cited

U.S. PATENT DOCUMENTS

| | | | |
|---|---|---|---|
| 11,138,458 B2* | 10/2021 | Hines | G06V 30/153 |
| 11,386,286 B2 | 7/2022 | Hines et al. | |
| 2007/0177791 A1 | 8/2007 | Shi et al. | |
| 2010/0185670 A1 | 7/2010 | Krishnan et al. | |
| 2011/0274361 A1 | 11/2011 | Bovik et al. | |
| 2019/0213247 A1 | 7/2019 | Pala et al. | |
| 2020/0125639 A1 | 4/2020 | Doyle | |

OTHER PUBLICATIONS

2016. Chapter 14: Autoencoders. Goodfellow et al. Deep Learning. MIT Press. Available at http :: //www.deeplearningbook.org.

Apr. 10, 2015—Very deep convolutional networks for large-scale image recognition. Karen Simonyan et al. Visual Geometry Group, Department of Engineerign Science, University of Oxford.

Oct. 14, 2008—Dirichlet processes: A gentle tutorial. Khalid El-Arini. Select Lab Meeting.

1997. Long short-term memory.Neural Computation. Sepp Hochreiter et al. pp. 1-32.

Jul. 1948, Oct—A mathematical theory of communication. The Bell System Technical Journal. C.E. Shannon. vol. 27. pp. 379-423, 623,656.

U.S. Appl. No. 16/514,009, filed Jul. 17, 2019.
U.S. Appl. No. 16/744,420, filed Jan. 16, 2020.

* cited by examiner

FIG. 5

$$Mn = \begin{matrix} 500 \\ \end{matrix} \begin{bmatrix} P_{1,1} & P_{1,2} & \ldots & P_{1,j} & \ldots & P_{1,S} \\ P_{2,1} & P_{2,2} & \ldots & P_{2,j} & \ldots & P_{2,S} \\ P_{3,1} & P_{3,2} & \ldots & P_{3,j} & \ldots & P_{3,S} \\ \ldots & \ldots & \ldots & \ldots & \ldots & \ldots \\ P_{i,1} & P_{i,2} & \ldots & P_{i,j} & \ldots & P_{i,S} \\ \ldots & \ldots & \ldots & \ldots & \ldots & \ldots \\ P_{S,1} & P_{S,2} & \ldots & P_{S,j} & \ldots & P_{S,S} \end{bmatrix}$$

METHOD AND SYSTEM FOR DETECTING DRIFT IN TEXT STREAMS

CROSS-REFERENCE TO RELATED APPLICATIONS

The present application is a continuation of co-pending U.S. application Ser. No. 16/744,420, filed on Jan. 16, 2020 and entitled "Method and System For Detecting Drift in Text Streams," which is a continuation of U.S. application Ser. No. 16/514,009, filed on Jul. 17, 2019 and entitled "Method And System For Detecting Drift In Text Streams," which issued as U.S. Pat. No. 10,579,894 on Mar. 3, 2020, the entireties of which are hereby incorporated by reference herein.

FIELD OF USE

Aspects of the disclosure relate generally to detecting drift in text streams, and, more specifically, to quantifying the stability of text streams and alerting administrators to changes in text streams.

BACKGROUND

Many critical systems rely on the persistent accumulation of data. However, these critical systems lack fail safes to monitor data streams in order to ensure that the incoming data streams are not corrupted or otherwise perturbed. That is, incoming data streams may change. This may be due to a change in the input or a problem with the input source. The systems in place to review, analyze, and classify the text contained in data streams will continue to work; however, the analysis will be wrong. This problem of detecting corrupted, perturbed, or changing text is further complicated by the unstructured nature of certain text files, such as log files. Likewise, various image capture systems and object character recognition systems may alter text when digitized. Accordingly, there is a problem with existing systems detecting when input text deviates from the expected and notifying administrators of such deviations. Furthermore, it can be difficult to differentiate between a single anomalous input and a fundamental shift or change in the stream itself.

Aspects described herein may address these and other problems, and generally improve the quality, efficiency, and speed with which systems detect deviations in text streams.

SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below. Corresponding apparatus, systems, and computer-readable media are also within the scope of the disclosure.

Methods and systems as described herein may include quantifying the content and nature of a stream of text to detect when the typical composition of the stream of text changes. Quantifying the content and nature of a stream of text may begin with generating a baseline representation of a first stream of text. In order to generate the baseline representation, the relationship between characters in the first stream of text may be quantified by determining how many times a first character is followed by a second character, and repeating that determination for each character in the first stream of text. A probability for each sequence of characters may be determined based on the number of times the second character follows the first character. Once the probability is determined for each possible sequence of characters, a first matrix may be generated from the determined probabilities to quantify the typical content of the first stream of text.

The first matrix may then be used as a control against subsequently received streams of text. A second stream of text may be quantified in a similar manner to the first stream of text in order to produce a second matrix. The second matrix may then be compared to the first matrix to determine the differences between the first stream of text and the second stream of text. Once a difference is determined, the difference may be compared to a threshold value. When the difference is equal to or exceeds the threshold value, an administrator may be notified that the second stream of text has changed and the system may take corrective action. Additionally, a significant number of changes to the text in a similar manner may cause an investigation into whether a fundamental change has occurred to the way the text stream is being generated.

These features, along with many others, are discussed in greater detail below.

BRIEF DESCRIPTION OF THE DRAWINGS

The present disclosure is described by way of example and not limited in the accompanying figures in which like reference numerals indicate similar elements and in which:

FIG. 5 shows an example of the first matrix in accordance with one or more aspects described herein.

DETAILED DESCRIPTION

Figure 1:
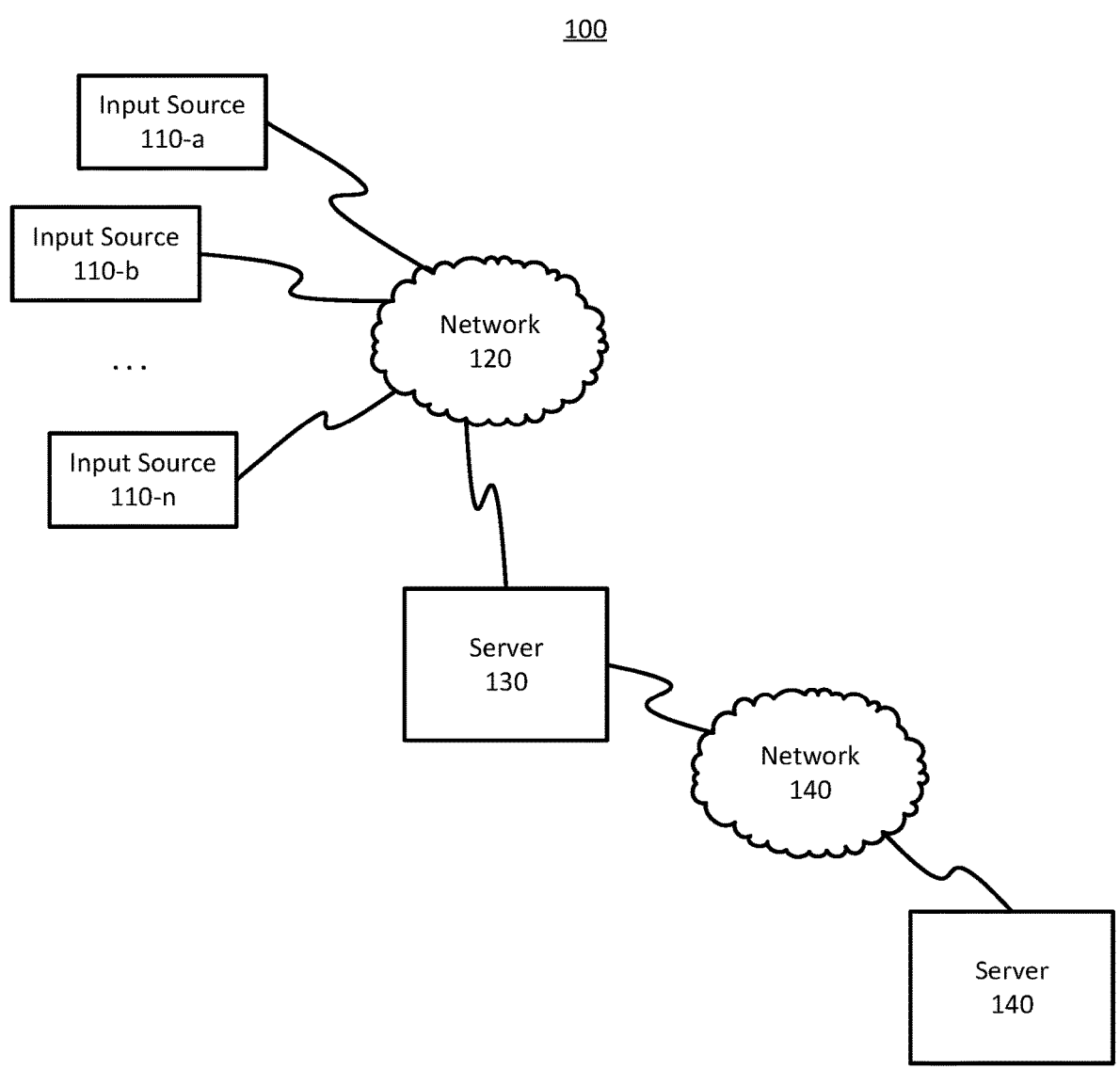
FIG. 1 shows an example of a control processing system in which one or more aspects described herein may be implemented.

In the following description of the various embodiments, reference is made to the accompanying drawings, which form a part hereof, and in which is shown by way of illustration various embodiments in which aspects of the disclosure may be practiced. It is to be understood that other embodiments may be utilized and structural and functional modifications may be made without departing from the scope of the present disclosure. Aspects of the disclosure are capable of other embodiments and of being practiced or being carried out in various ways. In addition, it is to be understood that the phraseology and terminology used herein are for the purpose of description and should not be regarded as limiting. Rather, the phrases and terms used herein are to be given their broadest interpretation and meaning.

By way of introduction, aspects discussed herein may relate to methods and techniques for detecting drift in streams of text. Text analysis systems are used to analyze large streams of text. However, these systems are not able to recognize when the text has altered significantly from the past. In this regard, changes in text may be due to a change in the input that may be indicative of a problem. Alternatively, the changes in text may be due to an issue with the input source. Without the ability to detect changes in the content or nature of the text, the text analysis system may overlook a problem in the text or the input source itself. Furthermore, the results of the text analysis system may be inaccurate and untrustworthy. Accordingly, existing text analysis systems cannot accurately detect when the content or nature of text varies from the expected, thereby wasting resources, such as processing cycles and time.

Systems as described herein may include quantifying, or otherwise generating, a numeric representation of the typical content and properties of a first stream of text. In order to generate a numeric representation of the typical content and properties of the first stream of text, the system may analyze the relationship between the characters of the first stream of text, and, in particular, the ordered relationship between a sequence of characters. The generated numeric representations may represent the probability that a first character may be followed by a second character in the sequence of characters. Next, the system may quantify the typical content of the first stream of text by generating a first matrix using a low-order Markov model and the generated numeric representations. The first matrix may serve as a baseline to which subsequent text streams are compared. Accordingly, the system may generate a second matrix, using the techniques described herein, from a second stream of text and compare the second matrix to the first matrix to determine a difference between the second stream of text and the first stream of text. When the difference is greater than or equal to a threshold, the system may notify an administrator of an apparent change in the text stream. The notification may include a human-in-loop system for manual inspection of the text. Furthermore, if the text deviates in a similar manner over time or across multiple text analysis systems, this may indicate a change in the data source more substantial than a single atypical example. Additionally, or alternatively, the system may attempt to determine the cause of the change and take steps to correct any issues.

The systems and methods described herein improve text analysis systems by detecting when text begins to drift from a baseline of expected text. By establishing the baseline of expected text and comparing subsequent text streams to the baseline, the text analysis system is better suited to detecting drift in text and curtailing the inefficiencies realized by not recognizing when the input text has changed.

FIG. 1 shows a system 100. The system 100 may include a plurality of input sources 110 (i.e., 110-*a*, 110-*b*, . . . 110-*n*) connected to first server 130 via first network 120. First server 120 may be connected to second server 150 through second network 140.

Input sources 110 may be any device capable of capturing, scanning, or generating text. In this regard, input sources may include cameras, camera-arrays, scanners, camera-enabled mobile-devices, object character recognition (OCR) software, etc. Text may include log files, a file dump, a memory dump, a core dump, characters identified via OCR, or any other type of unstructured string of characters. Additionally, input sources 110 may be configured to transmit text to a server, such as first server 130, via a network connection using the techniques described herein. According to some examples, input sources may include hardware and software that allow them to connect directly to first network 120. Alternatively, input sources 110 may connect to a local device, such as a personal computer, server, or other computing device, which connects to first network 120.

First network 120 may include any type of network. First network 140 may include a local area network (LAN), a wide area network (WAN), a wireless telecommunications network, and/or any other communication network or combination thereof. It will be appreciated that the network connections shown are illustrative and any means of establishing a communications link between the computers may be used. The existence of any of various network protocols such as TCP/IP, Ethernet, FTP, HTTP and the like, and of various wireless communication technologies such as GSM, CDMA, WiFi, and LTE, is presumed, and the various computing devices described herein may be configured to communicate using any of these network protocols or technologies.

First server 130 may be any server capable of executing a text analysis system that may be configured to process text streams using the techniques described herein. In this regard, first server 130 may be a stand-alone server, a corporate server, or a server located in a server farm or cloud-computer environment. According to some examples, first server 130 may be a virtual server hosted on hardware capable of supporting a plurality of virtual servers.

Much like first network 120, second network 140 may be any type of network. In some examples, second network 140 may be a corporate local area network (LAN) connecting first server 130 and second server 150. In other examples, second network 140 may include a site-to-site connection or dedicated lines that interconnect first server 130 and second server 150.

Similar to first server 130, second server 150 may be any server capable of processing the information and data contained in the text stream. In this regard, first server 130 and second server 150 may operate in parallel. Alternatively, first server 120 may process the text stream to detect any anomalies before transmitting the text to second server 150 for subsequent processing. In some examples, first server 130 and second server 150 may be co-located on the same device, located in the same cloud computing environment, or located in the same server farm.

The data transferred to and from various computing devices in system 100 may include secure and sensitive data, such as confidential documents, customer personally identifiable information, and account data. Therefore, it may be desirable to protect transmissions of such data using secure network protocols and encryption, and/or to protect the integrity of the data when stored on the various computing devices. For example, a file-based integration scheme or a service-based integration scheme may be utilized for transmitting data between the various computing devices. Data may be transmitted using various network communication protocols. Secure data transmission protocols and/or encryption may be used in file transfers to protect the integrity of the data, for example, File Transfer Protocol (FTP), Secure File Transfer Protocol (SFTP), and/or Pretty Good Privacy (PGP) encryption. In many embodiments, one or more web services may be implemented within the various computing devices. Web services may be accessed by authorized external devices and users to support input, extraction, and manipulation of data between the various computing devices in the system 100. Web services built to support a personalized display system may be cross-domain and/or cross-platform, and may be built for enterprise use. Data may be transmitted using the Secure Sockets Layer (SSL) or Transport Layer Security (TLS) protocol to provide secure connections between the computing devices. Web services may be implemented using the WS-Security standard, providing for secure SOAP messages using XML encryption. Specialized hardware may be used to provide secure web services. For example, secure network appliances may include built-in features such as hardware-accelerated SSL and HTTPS, WS-Security, and/or firewalls. Such specialized hardware may be installed and configured in the system 100 in front of one or more computing devices such that any external devices may communicate directly with the specialized hardware.

Figure 2:
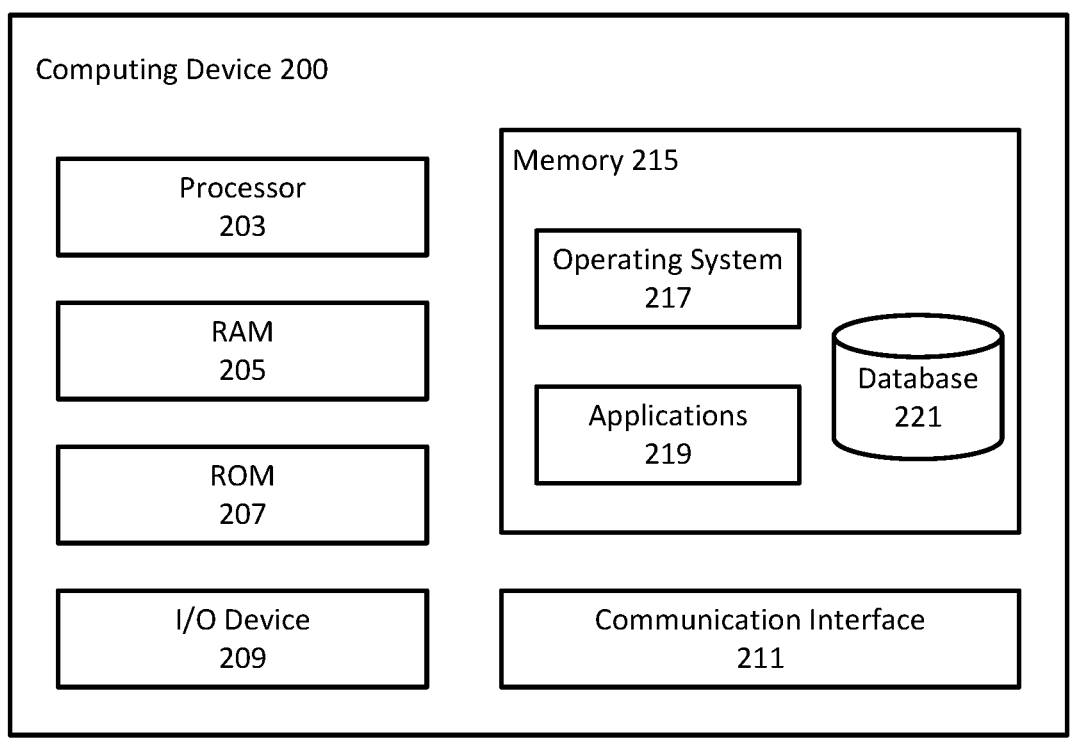
FIG. 2 shows an example computing device in accordance with one or more aspects described herein.

Any of the devices and systems described herein may be implemented, in whole or in part, using one or more computing systems described with respect to FIG. 2. Turning now to FIG. 2, a computing device 200 that may be used with one or more of the computational systems is described. The computing device 200 may include a processor 203 for controlling overall operation of the computing device 200 and its associated components, including RAM 205, ROM 207, input/output device 209, communication interface 211, and/or memory 215. A data bus (now shown) may interconnect processor(s) 203, RAM 205, ROM 207, memory 215, I/O device 209, and/or communication interface 211. In some embodiments, computing device 200 may represent, be incorporated in, and/or include various devices such as a desktop computer, a computer server, a mobile device, such as a laptop computer, a tablet computer, a smart phone, any other types of mobile computing devices, and the like, and/or any other type of data processing device.

Input/output (I/O) device 209 may include a microphone, keypad, touch screen, and/or stylus through which a user of the computing device 200 may provide input, and may also include one or more of a speaker for providing audio output and a video display device for providing textual, audiovisual, and/or graphical output. In examples where computing device 200 is an input source 110, I/O device 209 may include a device capable of obtaining text, such as cameras, camera-arrays, scanners, camera-enabled mobile-devices, object character recognition (OCR) software, etc. Alternatively, I/O device 209 may provide a connection for transferring text from an input source to computing device 200.

Memory 215 may store software to provide instructions to processor 203 that allow computing device 200 to perform various actions. For example, memory 215 may store software used by the computing device 200, such as an operating system 217, application programs 219, and/or an associated internal database 221. As will be described in greater detail below, memory 215 may store software that permits processor 203 to analyze text in a stream of text and detect when the text begins to deviate from the established baseline representation. The various hardware memory units in memory 215 may include volatile and nonvolatile, removable and non-removable media implemented in any method or technology for storage of information such as computer-readable instructions, data structures, program modules, or other data. Memory 215 may include one or more physical persistent memory devices and/or one or more non-persistent memory devices. Memory 215 may include, but is not limited to, random access memory (RAM) 205, read only memory (ROM) 207, electronically erasable programmable read only memory (EEPROM), flash memory or other memory technology, optical disk storage, magnetic cassettes, magnetic tape, magnetic disk storage or other magnetic storage devices, or any other medium that may be used to store the desired information and that may be accessed by processor 203.

Communication interface 211 may include one or more transceivers, digital signal processors, and/or additional circuitry and software for communicating via any network, wired or wireless, using any protocol as described herein. When located at input source 110, communication interface 211 may be configured to transmit a text stream from input source 110 to first server 130. Similarly, communication interface 211 may be configured to receive a text stream from input source 110 and transmit processed text and a determined difference associated with the text to another device when the communication interface 211 is located on first server 130.

Processor 203 may include a single central processing unit (CPU), which may be a single-core or multi-core processor, or may include multiple CPUs. Processor(s) 203 and associated components may allow the computing device 200 to execute a series of computer-readable instructions to perform some or all of the processes described herein. Although not shown in FIG. 2, various elements within memory 215 or other components in computing device 200, may include one or more caches, for example, CPU caches used by the processor 203, page caches used by the operating system 217, disk caches of a hard drive, and/or database caches used to cache content from database 221. For embodiments including a CPU cache, the CPU cache may be used by one or more processors 203 to reduce memory latency and access time. A processor 203 may retrieve data from or write data to the CPU cache rather than reading/writing to memory 215, which may improve the speed of these operations. In some examples, a database cache may be created in which certain data from a database 221 is cached in a separate smaller database in a memory separate from the database, such as in RAM 205 or on a separate computing device. For instance, in a multi-tiered application, a database cache on an application server may reduce data retrieval and data manipulation time by not needing to communicate over a network with a back-end database server. These types of caches and others may be included in various embodiments, and may provide potential advantages in certain implementations of devices, systems, and methods described herein, such as faster response times and less dependence on network conditions when transmitting and receiving data.

Although various components of computing device 200 are described separately, functionality of the various components may be combined and/or performed by a single component and/or multiple computing devices in communication without departing from the invention.

Figure 3:
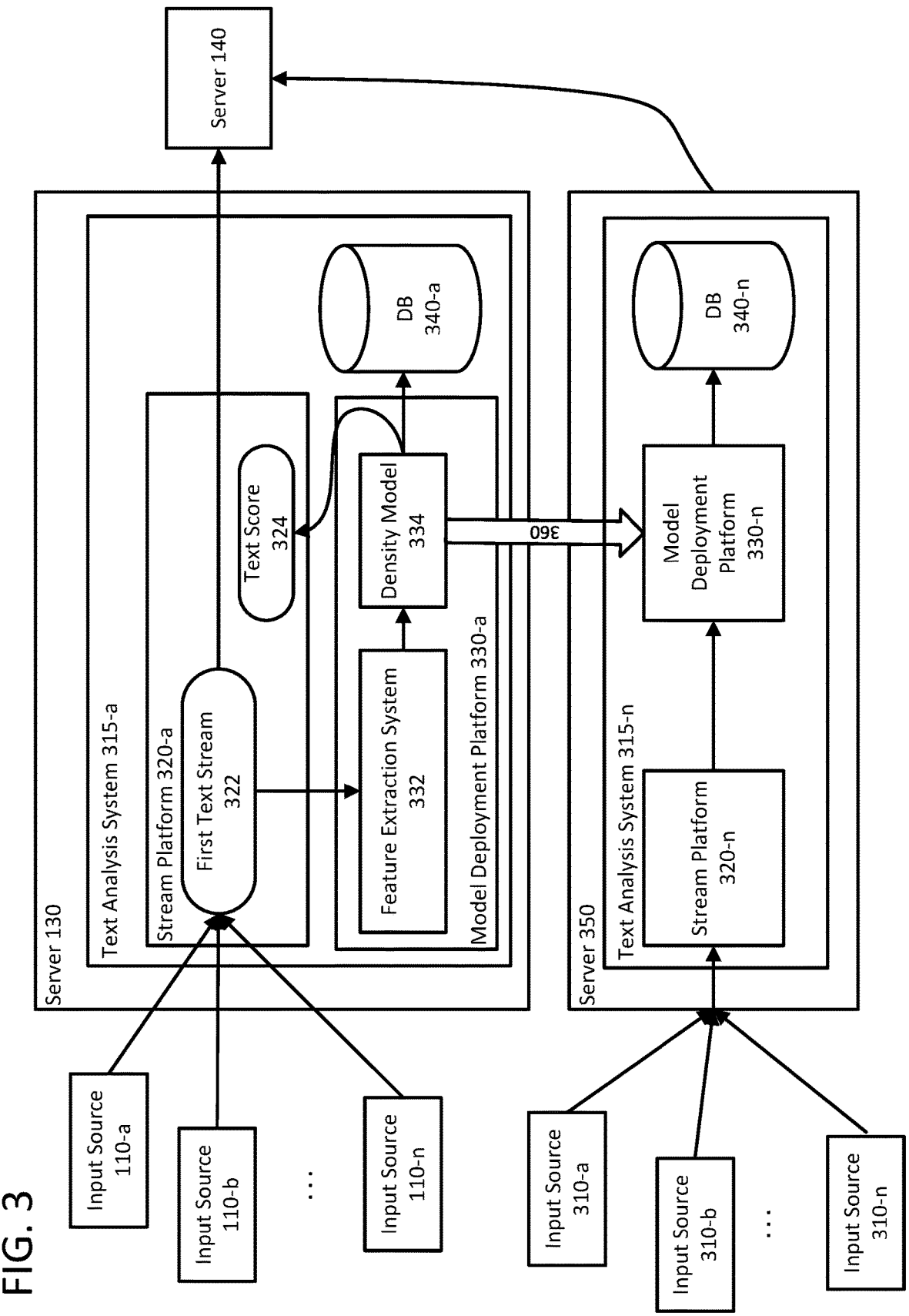
FIG. 3 shows an example of a server processing a stream of text in which one or more aspects described herein may be implemented.

As noted above, system 100 may be designed to detect when text in a stream of text begin to deviate from a baseline representation of the text that the text analysis system expects to receive in subsequent text streams. FIG. 3 shows an example of a first text analysis system 315-*a* executing on first server 130 and a second text analysis system 315-*n* executing on second server 350.

First server 130 includes a first text analysis system 315-*a* that includes a stream platform 320-*a* and a model deployment platform 330-*a*. Second server 350 also includes a second text analysis system 315-*n*, with its own stream platform 320-*n* and model deployment platform 330-*n*. In this regard, first server 130 and second server 350 may be part of a large scale text analysis deployment, which includes any number of servers configured to execute text analysis system 315-*x*. In these examples, first server 130 and second server 350 may belong to the same organization, but be deployed in geographically disparate regions. Additionally, or alternatively, second server 350 may be subordinate to first server 130. In these examples, model deployment platform 330-*a* may generate a first matrix and deploy the first matrix to model deployment platform 330-*n*, as illustrated by arrow 360. Regardless of which server they may be deployed on, text analysis system 315-*x*, stream platform 320-*x*, and model deployment platform 330-*x* may be similar in structure and operation. Further, text analysis system 315-*x*, stream platform 320-*x*, and model deployment platform 330-*x* may include software, hardware, firmware, or any combination thereof. For the sake of brevity, text analysis system 315-*x*, stream platform 320-*x*, and model deployment platform 330-*x* will be discussed with reference to first text analysis system 315-*a*, stream platform 320-*a*, and a model deployment platform 330-*a*.

Stream platform 320-*a* may be configured to receive first text stream 322 from the one or more input sources 110-*a*, 110-*b*, . . . 110-*n*. After receiving first text stream 322, stream platform 320-*a* may transfer first text stream 322 to model deployment platform 330-*a*. In preferred embodiments, feature extraction system 332 may receive the first text stream 322 from stream platform 320-*a*. Feature extraction system 332 may parse the first text stream to demarcate and classify successive characters in a sequence of text, such as first text stream 322. The process of demarcating and classifying successive characters may be known as tokenization. Tokenization results in tokens. As used herein, tokens refer to characters, such as letters, numbers, punctuation, special characters, mathematical notation, etc. A set of collective characters may be defined as a library. In some embodiments, tokens may include n-grams, where n is any whole number. For examples, tokens may be bi-grams and tri-grams. As used herein, tokens and characters may be used interchangeably.

In some embodiments, the model deployment platform 330-*x* and, in particular, density model 334 may be distributed to a plurality of servers. In this regard, feature extraction system 332 and density model 334 may be replicated across one or more servers. By replicating feature extraction system 332 and density model 334 across a plurality of servers, the analysis of subsequent text streams may be performed on a plurality of text streams in parallel using the matrix generated from first text stream 322. That is, each of the plurality of servers may perform the text analysis described herein on one or more text streams. Thus, each of the plurality of servers may operate in parallel to process a plurality of text streams.

In order to generate a numeric representation of first text stream 322, feature extraction system 332 may count the number of tokens in first text stream 322. That is, feature extraction system 332 may determine how many times a first character in a library is followed by a second character in the library. Turning to an example, feature extraction system 332 may recognize "p," "a," "t," "e," "n," and "t" as tokens in first text. Feature extraction system 332 may tabulate the number of times "p" is followed by "a" and "a" is followed "t" and so on and so forth. In another example, "pa," "at," "te," "en," and "nt" may be recognized. Accordingly, feature extraction system 332 may tabulate the number of times "pa" is followed by "te" and "te is followed by "nt." Feature extraction system 332 may tabulate the number of occurrences for each transition of successive characters for each of the characters in the corpus of first text stream 322.

Once the number of occurrences for each transition of successive characters has been tabulated, feature extraction system 332 may transfer the number of occurrences for each transition of successive characters to density model unit 334. Density model unit 334 may be configured to generate a first matrix that represents first text stream 322. In some examples, the first matrix may be a transition probability matrix. In this regard, the transition probability matrix may serve as a form of density estimation for discrete sequences of characters in first text stream 322. In other words, the first matrix may define a baseline representation of the text contained in first text stream 322. The first matrix may be generated using a Markov model to represent the relationship between individual characters or groups of characters. In preferred embodiments, the first matrix may be a square matrix that quantifies the probability of transitioning from any first character in a library to any second character in the library. By way of example, the first matrix may be a 26×26 matrix, with each column and row being associated with a letter of the English alphabet. Columns may represent the first letter in the sequence, and rows may represent the second letter in the sequence. Each element or entry in the first matrix may represent a probability of a first character being followed by a second character. For example, column one and row one may correspond to "a," column two and row two may correspond to letter "b," and so on. Accordingly, position 1,1 in the first matrix may represent the probability of the sequence "aa" occurring; position 1,2 may represent the probability of the sequence "ab" occurring; position 2,1 may represent the probability of the sequence "ba" occurring; and position 2,2 may represent the probability of the sequence "bb" occurring. The example above is merely illustrative and should not be considered limiting in any way.

In alternative embodiments, density model unit 334 may be configured to generate a first model that represents the text of first text input stream. The first model may be generated using statistical models of sequences, including recurrent neural networks. Regardless of the techniques used, a quantification, or compact numerical representation, of the typical content and properties of an object of unstructured text may be generated to represent first text stream 322.

Once the first matrix is built, the first matrix may be stored in database 340-*a*. Database 340-*a* may be unique to the server on which it is located. Alternatively, database 340-*a* and database 340-*n* may be a single, common memory location that stores information related to various text streams analyzed by the plurality of servers. As will be discussed in greater detail below, the first matrix may be used as a benchmark for subsequently received text streams. In these examples, a second text stream may be received and processed as above. Accordingly, a second matrix may be generated from the second text stream. The second matrix may then be compared to the first matrix to determine a difference between the text of the second text stream and the text of first text stream 322. Additionally, or alternatively, the difference may be represented by difference score 324, which may be stored in first database 340-*a*, as well as be provided to stream platform 320-*a*. Stream platform 320-*a* may cause difference score 324 to be displayed to a user, such as an administrator.

Quantifying the typical content and properties of an object of unstructured text may be the first step in generating a first matrix that represents a first text stream. Once the content and properties of the object of unstructured text are determined, the first matrix may be populated.

Figure 4:
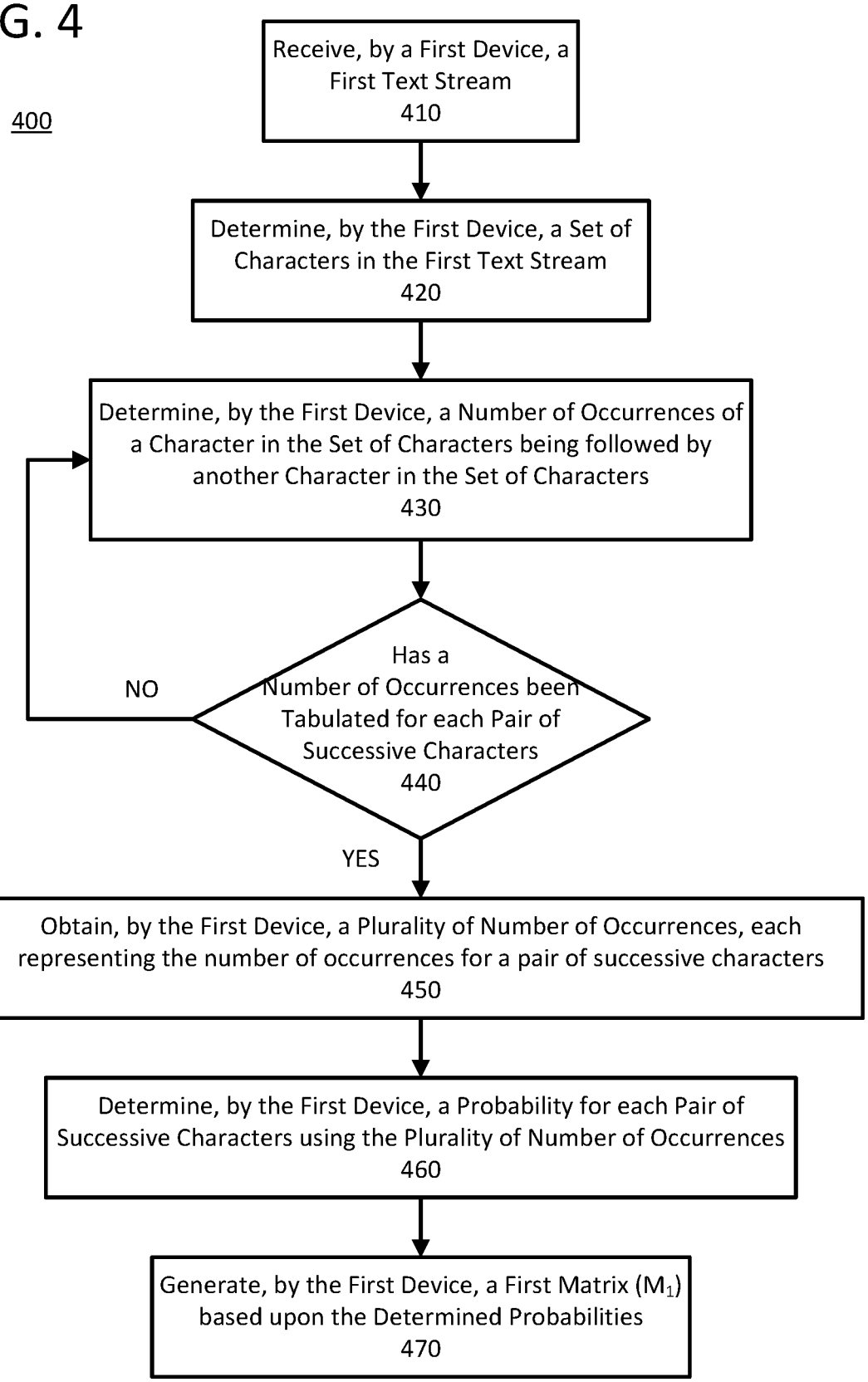
FIG. 4 shows a flow chart of a process for building a first matrix from a first text stream according to one or more aspects of the disclosure.

FIG. 4 shows a flow chart of a process 400 for building a first matrix from a first text stream according to one or more aspects of the disclosure. Some or all of the steps of process 400 may be performed using one or more computing devices as described herein.

Process 400 begins in block 410, with a first device receiving a first text stream. As noted above, the first text stream may be received from a plurality of input sources. Alternatively, the first text stream may be received from a single input source. In some examples, the first text stream may be training data. The training data may be a compilation of real world examples, such as log files from web applications, log files from critical systems that require monitoring, or human-generated messaging, such as emails, chat logs, or SMS logs.

In block 420, the first device may determine a set of characters in the first text stream. Determining the set of characters in the first text stream may include analyzing the first text stream and creating an array of the set of characters. Alternatively, the first device may include a library of characters and the first device may analyze the first text stream to determine which characters from the library of characters are present in the first text stream. In some embodiments, this step may be skipped in lieu of proceeding directly to block 430.

In block 430, the first device may determine a number of occurrences of a character in the set of characters being followed by another character in the set of characters. For instance, the first device may count the number of times "a" is followed by "a." In block 440, the first device may determine whether a number of occurrences has been tabulated for each group of successive characters. As noted above, the characters may be individual characters, bi-grams, tri-grams, or any number of characters. When the number of occurrences has not been tabulated for each group of successive characters, process 400 may return to block 430 to repeat the process of determining a number of occurrences for each pair of successive characters. Continuing the example above, the first device may determine the number of times "a" is followed by "b" and then the number of times "a" is followed by "c." This loop repeats until the number of occurrences for each pair of successive characters (i.e. "aa," "ab," "ac," etc.) has been tabulated.

When the number of occurrences for each pair of successive characters has been tabulated, a plurality of number of occurrences may be obtained in block 450. Each of the plurality of number of occurrences may represent the number of occurrences for each pair of successive characters. In this regard, a first number of occurrences may indicate the number of times "aa" occur in the first input text, a second number of occurrences may indicate the number of times "ab" occur, and so on. In block 460, the first device may determine a probability for each pair of successive characters using the plurality of number of occurrences. The probability may be determined, for example, by dividing the number of occurrences for each pair of successive characters by the total number of possible pairs of successive characters. In block 470, the first device may generate the first matrix ($M_1$) using the probabilities determined for each pair of successive characters.

Process 400 may be repeated at regular intervals (i.e., hourly or daily) to update the first matrix in order to evaluate the temporal stability of an input stream. As will be discussed in greater detail below, the first matrix may be used as a control against subsequently received streams of text. According to these examples, the first stream of text and the subsequently received streams of text may be the same input stream of data at different points in time. That is, the first stream of text may represent the stream of data at a first time ($T_1$), while a second stream of text may represent the stream of data at a second time ($T_2$). Because the input stream of data may change over time, the first matrix may need to be updated to stay abreast of minor changes that occur in the input stream over time.

Turning to FIG. 5, an example of first matrix 500 is shown in accordance with one or more aspects described herein. As noted above, first matrix 500 may be a square matrix, with each column and row being associated with a character, bi-gram, tri-gram, or n-gram. Columns may represent the first character, or first n-gram, in the sequence, and rows may represent the second character, or second n-gram, in the sequence. The element where the respective column and respective row intersect may be a probability that the first character precedes the second character. Returning to the example above, where the first column and the first row represents "a," the element denoted $P_{1,1}$ may be 0.00 because the probability of "aa" occurring is low based on the analysis of the first text stream. In a different example, the element denoted $P_{17,21}$ may indicate the probability of "u" following "q." In this example, $P_{17,21}$ may indicate a probability of 0.99.

Figure 6A:
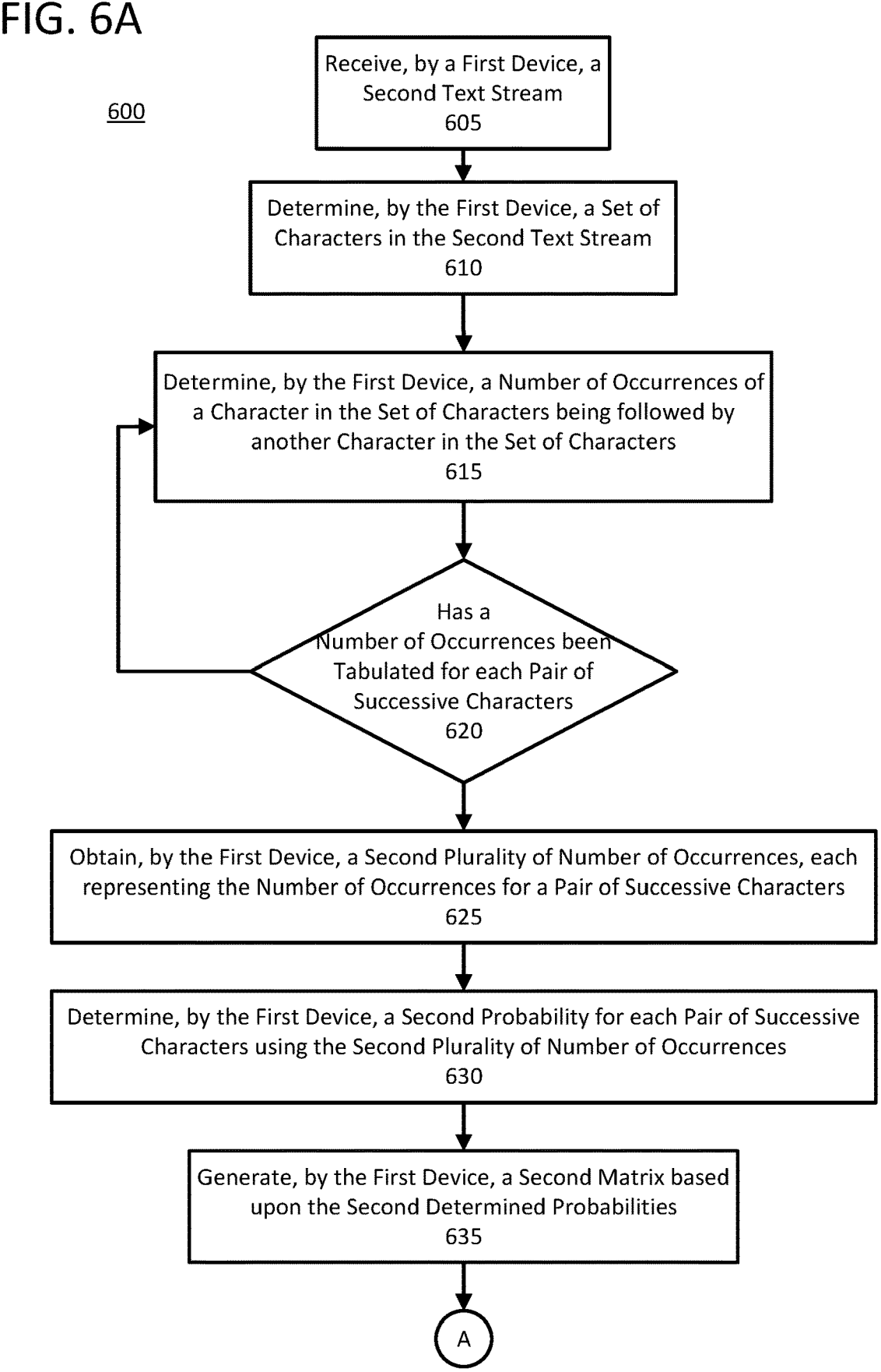
FIGS. 6A and 6B show a flow chart for comparing a second matrix to the first matrix to determine whether a difference between a second text stream and the first text stream according to one or more aspects of the disclosure.
Figure 6B:
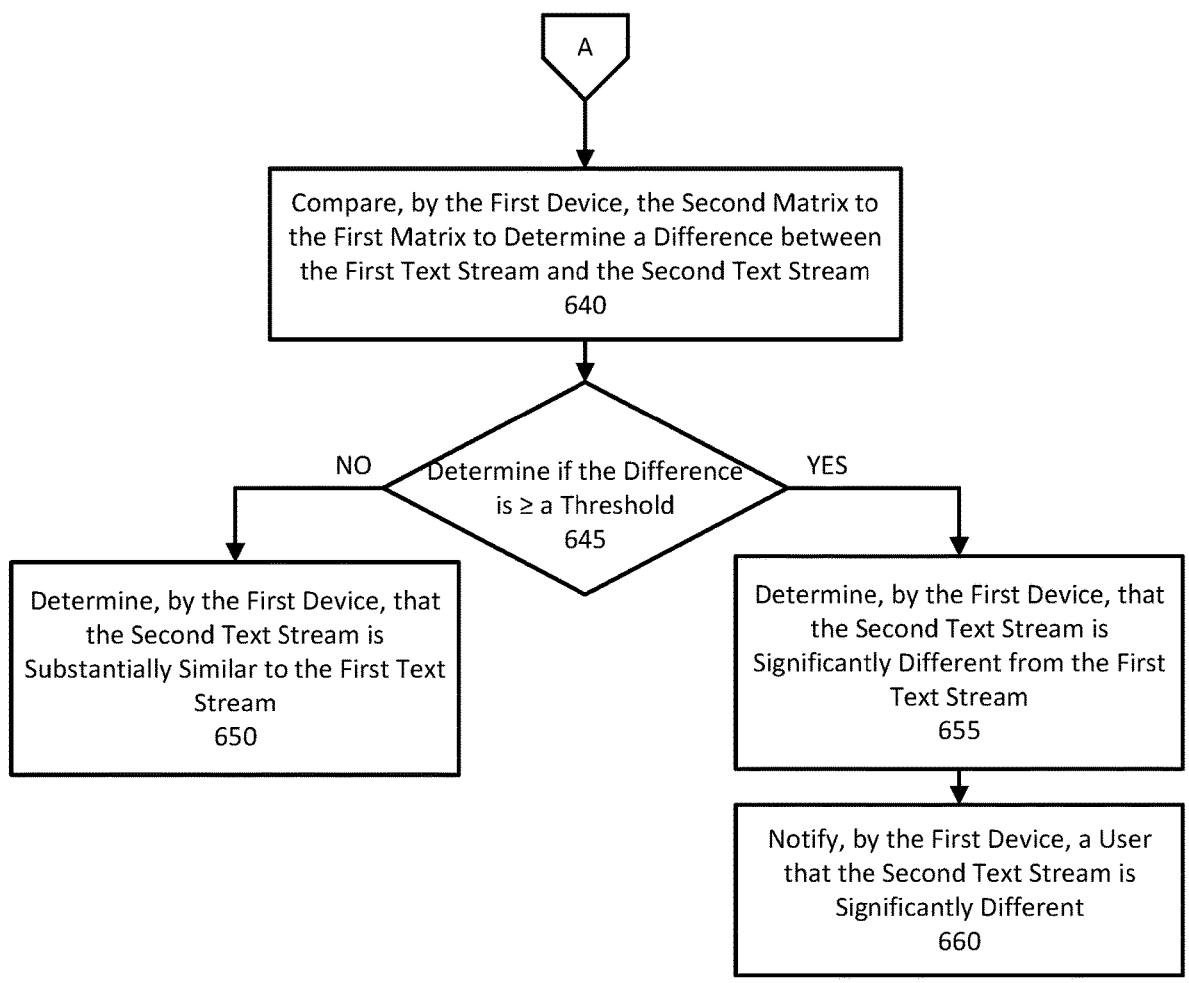

Once the first matrix has been generated, the first matrix may be used as a control against which subsequent text streams can be compared. Such a comparison may be performed to determine whether a second text stream is stable (i.e., similar) to a first text stream or whether the second stream may be drifting from the first text stream. FIG. 6 shows a flow chart of a process 600 for comparing a second matrix to the first matrix to determine whether a difference between a second text stream and the first text stream according to one or more aspects of the disclosure. Some or all of the steps of process 600 may be performed using one or more computing devices as described herein.

Process 600 begins in block 605 with the first device receiving a second text stream. The second text stream may be received from an input source, as discussed above. Alternatively, the second text stream may be part of the same stream of data as the first text stream. As noted above, the second text stream may be from a different time (i.e., $T_2$) than the first text stream (i.e., $T_1$). This may be done to verify that the stream of data is stable over time.

In block 610, the first device may determine a set of characters in the second text stream using the techniques described above. In block 615, the first device may determine a number of occurrences of a character in the set of characters being followed by another character in the set of characters. In block 620, the first device may determine if a number of occurrences has been tabulated for each pair of successive characters. When the number of occurrences has not been tabulated for each pair of successive characters, process 600 may return to block 615 to repeat the process of determining a number of occurrences for each pair of successive characters.

When the number of occurrences for each pair of successive characters has been determined, process 600 proceeds to block 625, where the first device may obtain a second plurality of number of occurrences. Each of the second plurality of number of occurrences represents how many times a successive pair of characters appears in the second text stream. In block 630, the first device may determine a second probability for each pair of successive characters using the second plurality of number of occurrences. In block 635, the first device may generate the second matrix ($M_2$) using the second probabilities determined for each pair of successive characters.

In block 640, the first device may compare the second matrix ($M_2$) to the first matrix ($M_1$) to determine a difference between the first text stream and the second text stream. In preferred examples, the difference may be determined in real-time or near real-time (e.g. a delay of several seconds). The comparison may be performed using matrix norms, such as Frobenius norms, Schatten norms, consistent norms, compatible norms, equivalence norms, or the like. By estimating a first matrix ($M_1$) at time ($T_1$) and a second matrix ($M_2$) at a time ($T_2$) and comparing the difference according to $$\Delta = \|M_1 - M_2\|$$

an estimate of the drift (i.e., difference) between the two time points may be determined.

After determining the difference, the first device may determine whether the difference is greater than or equal to a threshold value in block 645. The threshold value may be set by a user or administrator. Additionally, or alternatively, the threshold value may be automatically determined by the system in accordance with mathematical principles. In this regard, the threshold value may indicate a degree of permitted variability between the first text stream and the second text stream. In some embodiments, the threshold value may be set so that anomalies in the second text stream will not indicate drift. In this regard, a text stream may contain a small number of deviations and aberrations when compared to the model of the first text stream. These deviations and aberrations may be classified as anomalies, which may be expected in a text stream. However, drift may be determined when a statistically significant number of substantially similar anomalies occur in a text stream. For example, a further inquiry into drift may be determined if at least 10% of the text in the text stream may be classified as anomalous. In these instances, the anomalous text may be stored in a database and subject to additional analysis. For example, the text analysis system may use clustering techniques to determine whether there are substantial similarities in the anomalous text by detecting whether the anomalous text contains any common features. When there are common features, the anomalous text may be deemed substantially similar. Accordingly, drift may be determined and corrective action taken. In some embodiments, the density model may be updated to include the substantially similar anomalies found in the text stream.

When the difference is less than the threshold value, the first device may determine that the second text stream is substantially similar to the first text stream in block 650. In this context, substantially similar means that the second text stream is within the accepted range of tolerance (i.e., permitted variability) and is, therefore, similar to the text contained in the first text stream. This may show that the continuous text stream has remained stable over time.

When the difference is greater than or equal to a threshold value, however, process 600 may proceed to block 655 where the first device may determine that the second text stream is significantly different from the first text stream. Significantly different, in this context, means that the second text stream is outside the range of permitted variability defined by the system. Being significantly different may also indicate a drift in the input and steps may be taken to determine the cause of the drift. The first device may notify a user that the second text stream is significantly different in block 660. This notification may prompt the user to review the second text stream to determine if a drift in the input may be occurring. Additionally, or alternatively, the notification may indicate a technical problem with the input source that requires attention. In some examples, the first device may issue one or more commands in an attempt to fix the input source and correct the cause of the detected drift.

One or more aspects discussed herein may be embodied in computer-usable or readable data and/or computer-executable instructions, such as in one or more program modules, executed by one or more computers or other devices as described herein. Generally, program modules include routines, programs, objects, components, data structures, and the like. that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a computer readable medium such as a hard disk, optical disk, removable storage media, solid-state memory, RAM, and the like. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects discussed herein, and such data structures are contemplated within the scope of computer executable instructions and computer-usable data described herein. Various aspects discussed herein may be embodied as a method, a computing device, a system, and/or a computer program product.

Although the present invention has been described in certain specific aspects, many additional modifications and variations would be apparent to those skilled in the art. In particular, any of the various processes described above may be performed in alternative sequences and/or in parallel (on different computing devices) in order to achieve similar results in a manner that is more appropriate to the requirements of a specific application. It is therefore to be understood that the present invention may be practiced otherwise than specifically described without departing from the scope and spirit of the present invention. Thus, embodiments of the present invention should be considered in all respects as illustrative and not restrictive. Accordingly, the scope of the invention should be determined not by the embodiments illustrated, but by the appended claims and their equivalents.

What is claimed is:

1. A computer-implemented method for detecting drift in streaming text, wherein the method comprises:
   generating, by a first device, a first transition probability matrix from first streaming text;
   generating, by the first device, a second transition probability matrix from second streaming text;
   comparing, by the first device, the first transition probability matrix and the second transition probability matrix to determine a difference between the first streaming text and the second streaming text; and
   indicating, by the first device, that the second streaming text is different from the first streaming text based on the difference between the first transition probability matrix and the second transition probability matrix being greater than or equal to a threshold.

2. The computer-implemented method of claim 1, wherein each entry in the first transition probability matrix identifies a probability of transitioning from a first n-gram to a second n-gram.

3. The computer-implemented method of claim 1, wherein comparing the first transition probability matrix and the second transition probability matrix comprises:
estimating, using a matrix norm, the difference between the first transition probability matrix and the second transition probability matrix.

4. The computer-implemented method of claim 1, comprising:
notifying, by the first device, an administrator based on the difference being greater than or equal to the threshold.

5. The computer-implemented method of claim 1, wherein the first transition probability matrix is a Markov model.

6. The computer-implemented method of claim 1, wherein generating the first transition probability matrix comprises:
determining, by the first device, a plurality of pairs of characters in the first streaming text, wherein a pair of characters comprises a first character transitioning to one of a plurality of characters;
determining, by the first device, a number of times each of the plurality of pairs of characters appears in the first streaming text;
determining, by the first device, a probability for each of the plurality of pairs of characters, wherein the probability is determined according to the number of times each of the plurality of pairs of characters appears in the first streaming text; and
populating, by the first device, the first transition probability matrix with the probability determined for each of the pairs of characters.

7. The computer-implemented method of claim 1, wherein the first streaming data comprises a baseline expectation of the streaming data.

8. A system for detecting drift in streaming data, the system comprising:
one or more processors; and
memory storing instructions that, when executed by the one or more processors, cause the one or more processors to:
generate a first transition probability matrix from first streaming text;
generate a second transition probability matrix from second streaming text;
compare the first transition probability matrix and the second transition probability matrix to determine a difference between the first streaming text and the second streaming text; and
indicate that the second streaming text is drifting from the first streaming text based on the difference between the first transition probability matrix and the second transition probability matrix being greater than or equal to a threshold.

9. The system of claim 8, wherein the first transition probability matrix is a first Markov model that identifies a probability of transitioning from a first n-gram to a second n-gram.

10. The system of claim 8, wherein the first streaming text comprises training data.

11. The system of claim 8, wherein the instructions cause the one or more processors to:
notify an administrator based on the difference being greater than or equal to the threshold.

12. The system of claim 8, wherein instructions cause the one or more processors to:
issue at least one command to an input source to correct a cause of the difference between the second streaming text and the first streaming text.

13. The system of claim 8, wherein the instructions cause the one or more processors to:
determine a plurality of pairs of tokens in the first stream, wherein a pair of tokens comprises a first character transitioning to one of a plurality of characters;
determine a number of times each of the plurality of pairs of tokens appears in the first stream;
determine a probability for each of the plurality of pairs of tokens, wherein the probability is determined according to the number of times each of the plurality of pairs of tokens appears in the first stream; and
populate the first transition probability matrix with the probability determined for each of the pairs of tokens.

14. The system of claim 8, wherein
the second streaming text comprises a different stream from the first stream.

15. A non-transitory computer-readable medium storing instructions that, when executed, cause a computing device to:
generate a first transition probability matrix from first streaming set of characters;
generate a second transition probability matrix from a second streaming set of characters;
compare the first transition probability matrix and the second transition probability matrix to determine a difference between the first streaming set of characters and the second streaming set of characters; and
detect that the second streaming set of characters is drifting from the first streaming set of characters based on the difference between the first transition probability matrix and the second transition probability matrix being greater than or equal to a threshold.

16. The non-transitory computer-readable media of claim 15, wherein the instructions, when executed, cause the computing device to:
notify an administrator that the second streaming set of characters is different from the first streaming set of characters based on the difference being greater than or equal to the threshold.

17. The non-transitory computer-readable medium of claim 15, wherein the instructions, when executed, cause the computing device to:
issue at least one command to an input to correct a cause of the difference between the second streaming set of characters and the first streaming set of characters.

18. The non-transitory computer-readable medium of claim 15, wherein the instructions, when executed, cause the computing device to:
determine a plurality of pairs of tokens in the first streaming set of characters, wherein a pair of tokens comprises a first character transitioning to one of a plurality of characters;
determine a number of times each of the plurality of pairs of tokens appears in the first streaming set of characters;
determine a probability for each of the plurality of pairs of tokens, wherein the probability is determined according to the number of times each of the plurality of pairs of tokens appears in the first streaming set of characters; and
populate the first transition probability matrix with the probability determined for each of the pairs of tokens.

19. The non-transitory computer-readable medium of claim 15, wherein:

the second streaming set of characters comprises a different set of characters from the first stream.

20. The non-transitory computer-readable medium of claim 15, wherein the first streaming set of characters comprises training data.

* * * * *